United States Patent
Dahlgren

(10) Patent No.: US 9,115,993 B1
(45) Date of Patent: Aug. 25, 2015

(54) FUSED PM FIBER SINGLE-POLARIZATION RESONATOR

(75) Inventor: Robert P. Dahlgren, Somerville, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 07/575,319

(22) Filed: Aug. 30, 1990

(51) Int. Cl.
*G01C 19/72* (2006.01)

(52) U.S. Cl.
CPC ...................................... *G01C 19/72* (2013.01)

(58) Field of Classification Search
CPC ......... G01C 3/08; G01C 19/72; G02B 6/2826
USPC ........... 356/350; 350/96.13–96.3; 385/29, 94, 385/96, 122; 372/94
See application file for complete search history.

(56) References Cited

U.S. PATENT DOCUMENTS

| | | | | |
|---|---|---|---|---|
| 4,469,397 A | | 9/1984 | Shaw et al. | 350/96.15 |
| 4,707,136 A | * | 11/1987 | Kim | 356/464 |
| 4,735,506 A | * | 4/1988 | Pavlath | 356/464 |
| 4,915,503 A | * | 4/1990 | Pavlath | 356/460 |
| 4,997,282 A | * | 3/1991 | Pavlath | 356/460 |

OTHER PUBLICATIONS

"In-line birefringent fiber polarizer", Carl A. Villarruel, et al., Proceedings Abstract, Monday, Jan. 23. 1984.
ComDarision Between Coil and Taper Fibre-Polarisers, Proc. SPIE 514, pp. 329-330, 1984.
"Analysis of mode coupling behavior in fused polarization-maintaining fiber couplers", Itaru Yokohama , Applied Optics/ vol. 28, No. 19/ Oct. 1, 1989, pp. 4216-4225.
"Low excess loss conditions of polarization-maintaining fiber couplers", Itaru Yokohama, et al., Applied Optics, vol. 27, No. 23, Dec. 1, 1988, pp. 4807-4813.
"Tapered polarizing anisotropic fibers", Chen, Optical Society of America, Optics Letters, vol. 13, No. 7, Jul. 1988, pp. 598-600.

* cited by examiner

*Primary Examiner* — Luke Ratcliffe
(74) *Attorney, Agent, or Firm* — Edward A. Gordon; Foley & Lardner LLP

(57) ABSTRACT

A resonant fiber optic gyro has a tapered polarizer in the ring to produce a single resonant polarization mode. A fused coupler closes the ring and provides inlet and outlet paths, with the entire device fabricated from a single PM fiber, thereby eliminating sources of backscatter and drift. In a preferred embodiment MSR fiber is used, and preferably the fused coupler is fabricated to achieve high finesse and modulation depth with its splitting ratio approximately equal to ring transmission coefficients. Apparatus and methods for forming the polarizer and the coupler are described.

12 Claims, 3 Drawing Sheets

IMPROVED FIBER RESONATOR

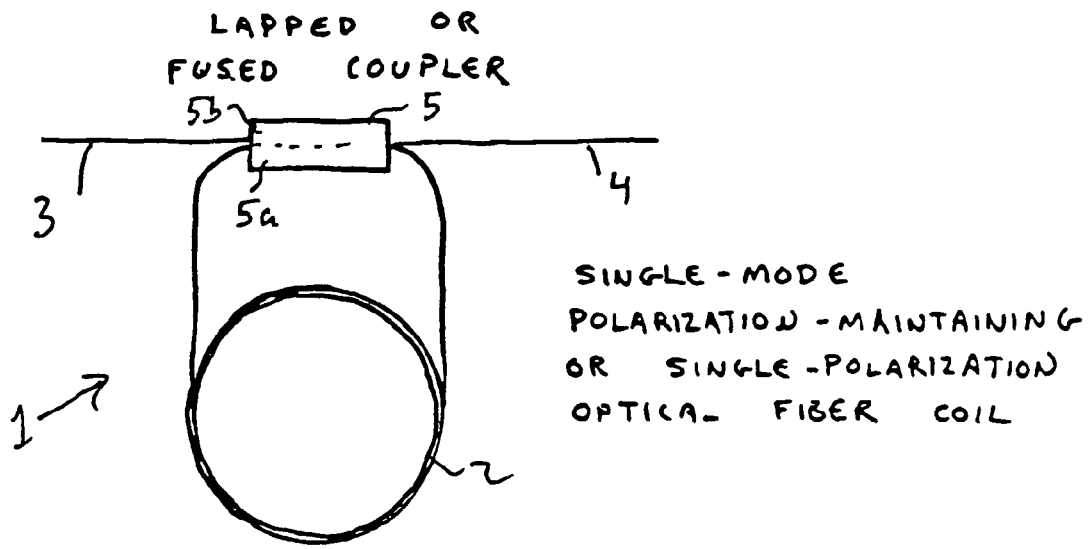
FIGURE 1    Prior Art Fiber Resonator
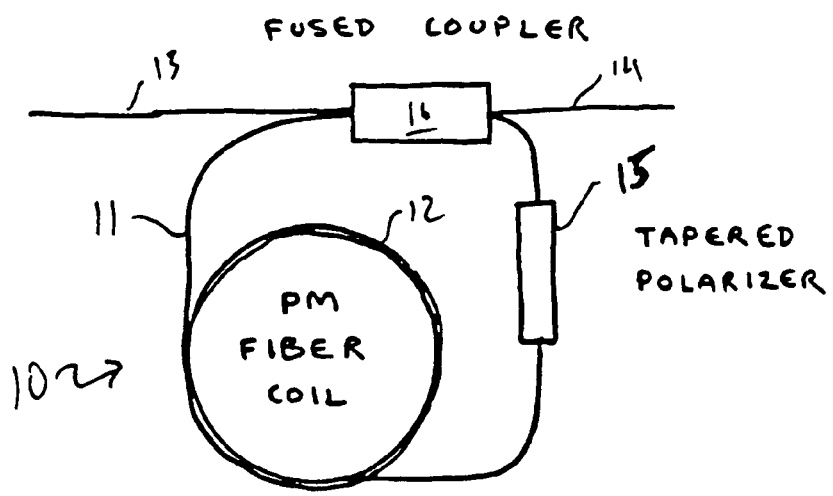
FIGURE 2    Improved Fiber Resonator

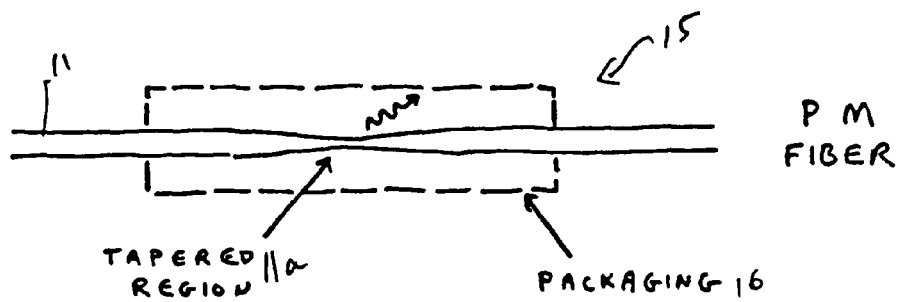
FIGURE 3   TAPERED POLARIZER
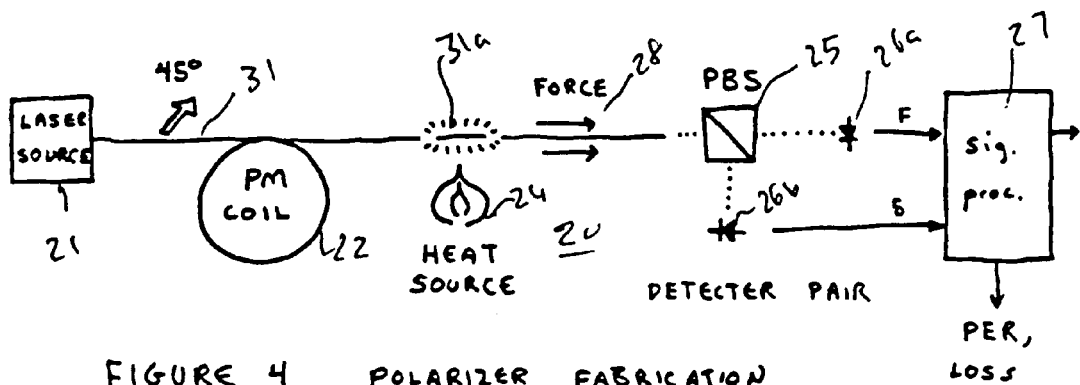
FIGURE 4   POLARIZER FABRICATION
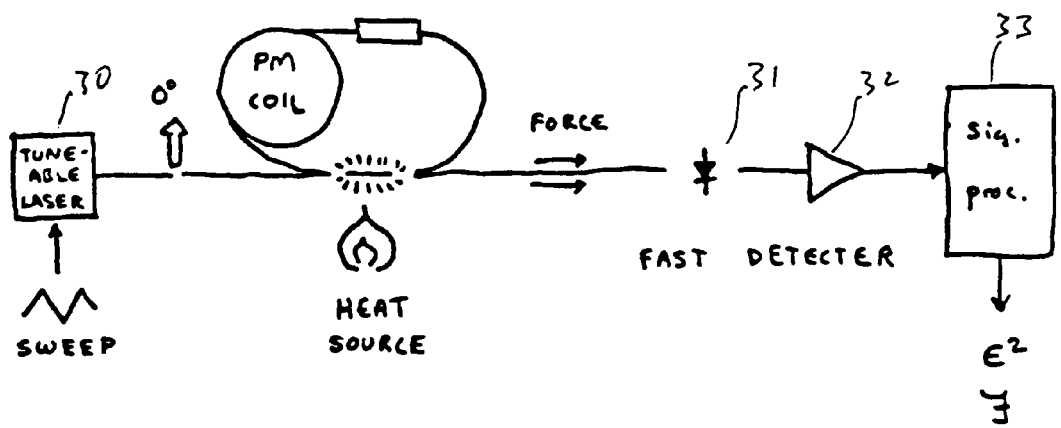
FIGURE 5   RESONATOR FABRICATION

FUSED PM FIBER SINGLE-POLARIZATION RESONATOR

BACKGROUND OF THE INVENTION

The present invention relates to optical fiber sensor devices employing a fiber optic resonant ring. A fiber optic resonant ring, in conjunction with appropriate signal processing optoelectronics, responds to rotation with respect to a fixed inertial frame of reference, and can be employed as a highly sensitive and stable gyroscope in an inertial measurement system such as a vehicular navigation system. The sensitivity and utility of resonant fiber optic gyroscopes is limited by various environmental perturbations which can produce signal effects dominating the rotationally induced effects of interest. The architectures for resonant fiber optic gyroscopes (RFOGs) have evolved toward constructions yielding greater sensitivity, and the different architectures have progressively overcome each of the previously troublesome sources of environmental noise, while in each case being subject to a further environmental effect as its limiting constraint. The development of RFOGs has proceeded generally as follows.

The first RFOGs used resonant ring cavities fabricated out of single-mode (SM) optical fibers. The ring resonator consists of a closed loop of fiber configured as a coil and directionally coupled to an input/output fiber path. See FIG. 1. A fiber optic coupler, a four-port device with a given coupling ratio, is used to apply probe signals and to read out the transfer function (dips) of the cavity.

Single-mode fibers guide two nearly degenerate orthogonal polarization modes, which can easily couple to one another because of nearly matching propagation constants $\beta$. The degeneracy allows changing of the state of polarization, denoted SOP herein, of the light propagating in the fiber, so that multiple time-varying resonances occur as environmental conditions perturb the RFOG. Amplitude and separation will change for both SOPs. The signal processing generally consists of a servo of laser probe wavelength locked to cavity resonant dip; the detector cannot distinguish SOP and the electronics has problems locking to multiple dips. The drift in resonances and varying SOP is manifested as random drift in the sensed parameters constituting the gyro output, rendering the SM fiber construction useless for navigation-grade applications.

Subsequently, with the development of effective polarization-maintaining (PM) optical fibers, RFOGs were fabricated using this type of fiber and a resonant ring configuration essentially like that of the early SM fiber devices. In a PM fiber, a high degree of anisotropy, usually created by stress-induced fiber birefringence, breaks the degeneracy between the two orthogonal polarization modes. Because the modes in a PM fiber propagate at different $\beta$ velocities, polarization cross-coupling, denoted PCC herein, is reduced to negligible levels, yielding a predictable SOP of light guided in the fiber. For example, if linearly polarized light is launched into the fiber such that the direction of polarization is aligned with one of the fiber's axes of symmetry, the SOP remains linear. There is a small cross-coupled component which arises when the light has traversed a great length of fiber, the magnitude of which is a function of fiber design and fabrication, winding, and input axis alignment; there are also PCC effects in the coupler and in other PM fiber components, e.g., splices used in construction of a complete gyroscope. When a resonator is fabricated out of PM fiber and the two modes propagate at different velocities, there are two resonances of differing orders. These two resonances are nominally independent for low PCC values in the ring assembly. When a pair of well-aligned polarizers are used on the input and outputs of the resonator, one resonance is greatly reduced with respect to the orthogonal dip. When this system is used in conjunction with the servo electronics to lock on a single dip it results in less output parameter drift when this type of fiber is used in an RFOG. Unfortunately, since the two resonances are of different order, environmental perturbations cause them to overlap occasionally, again resulting in unacceptable gyro drift and loss of output signal tracking. Even for extreme polarization isolation in the resonator components and assembly, when the resonances overlap, large coupling can occur due to phase matching conditions.

The next improvement to RFOG design included single-polarization (SP) optical fiber, again using essentially the same general resonant ring architecture as shown in FIG. 1. This design involves a modification of the PM fiber design, which, in addition to the aforementioned property of mode isolation, has the property that it preferentially attenuates one of the polarization modes. The quality of an SP fiber depends on the difference of mode attenuation for a given length of fiber, and is called the polarization extinction ratio (hereinafter PER). It is limited by the PCC of the fiber. When SP fiber is used in a resonant ring, the preferred mode resonates as before, and the attenuated mode does not resonate because it is extinguished at a rate that prevents a resonance from occurring in that mode. This approach results in a ring having only one resonant mode, yielding a truly single-channel resonant ring. Such RFOGs are capable of low drift rates and navigation-grade performance.

The foregoing is believed to represent the state-of-the-art technology for the construction of RFOG resonant rings.

The resonant ring used in the best RFOGs is presently made by a lapped coupler method, in which the pigtails of a wound fiber coil are each bonded into one of a pair of coupler block substrates, and surface region of each substrate is polished to almost reach the fiber core. When the two polished halves are assembled, evanescent coupling is effected between the entrance and exit pigtails so that the intermediate segment of the fiber forms a closed ring path making a resonant cavity of the fiber coil. During assembly the coupling ratio of the coupler so formed is optimized to equal the sum of cavity losses, and the two halves are then bonded in place to form a permanent assembly.

One problem with this approach is that the bond formed does not remain stable over environmental extremes, but causes the coupling ratio to shift, which reduces resonance amplitude, and the performance of the resonator to degrade. Another problem with the lapped coupler approach is that when this technique is used with a PM or especially with an SP fiber, the internal fiber stress which maintains fiber birefringence is perturbed by the partial removal of the fiber cladding and stress regions. SP fiber, which is the preferred fiber for RFOGs, is expensive and particularly difficult to fabricate into a reliable coupler using lapping, since the high stress value within the fiber is prone to degradation when the fiber is worked.

Catastrophic failure, polarization cross-coupling degradation, and extreme coupling ratio shift are often observed for this type of fiber even in a laboratory environment.

Because of these instabilities, applicant has determined that fused couplers are a preferred coupler technology for the fabrication of RFOGs. As demonstrated for SM fiber, fused components are well suited for mass production, have low losses and polarization cross-coupling, and most importantly, have been repeatably demonstrated to be environmentally rugged. However, these couplers, if made with PM or SP fiber, require the fiber stress regions be of the same refractive index as the surrounding. This property is incompatible with current SP fiber design. Special fibers with a matched stress region (MSR) design may be required to achieve low loss PM fused couplers.

Reverting to an RFOG design with a PM fiber rather than an SP fiber for the coil would allow the use of fused couplers, but would require the incorporation of a polarizer into the ring itself in order to obtain the instrument sensitivity of a single polarization resonant ring. But polarizer constructions made from PM fibers tend to have a lapped surface, and thus might be expected to re-introduce the environmental instabilities or manufacturing complexities of lapped coupler technology. A polarizer could be made by simply splicing in a length of SP fiber, by an arc fusion splice, but this would tend to introduce back reflections due to the mismatch of the fiber properties.

SUMMARY OF THE INVENTION

It is an object of the invention to provide a resonant spliceless fiber optic ring which resonates in a single polarization mode.

It is another object of the invention to provide a resonant fiber optic ring which is free of lapped junctions or splices.

These and other desirable properties are achieved in a basic embodiment of the invention by providing a length of PM fiber having a central loop or multi-turn coil and a long pigtail at each end of the coil. A region of the fiber on a pigtail is heated and drawn to a sufficient taper so that one of two polarization modes becomes leaky and radiates out of the tapered region. Next a fused coupler is made between the two pigtails with low loss and high coupling ratio. The fiber coil between the pigtails becomes a closed resonant ring cavity, while the pigtails serve as an input and an output path to the ring. The drawn tapered region leaks a sufficient amount of one polarization mode so that no ring resonance can occur in that mode, while resonance of the other mode is unaffected. The fiber resonant ring cavity therefore resonates in a single polarization mode. The drawn taper is fabricated with a relatively low polarization extinction ratio, which is typically below ten decibels. Preferably, the coupler is then fabricated to have a splitting ratio approximately equal to the total loop loss in the coil and polarizer and coupler. This results in low-loss propagation of a single polarization mode.

BRIEF DESCRIPTION OF DRAWINGS

These and other features of the invention will be understood from the description herein of illustrated embodiments, read in light of the background knowledge of persons skilled in the art, and taken together with the drawings, wherein FIG. 1 illustrates a prior art resonant fiber optic ring construction;

FIG. 2 illustrates a resonant ring in accordance with the present invention;

FIG. 3 illustrates the tapered polarizer appearing in the ring of FIG. 2;

FIGS. 4 and 5 illustrate the fabrication of a polarizer and ring as shown in FIGS. 2 and 3.

DETAILED DESCRIPTION

Figure 3A:
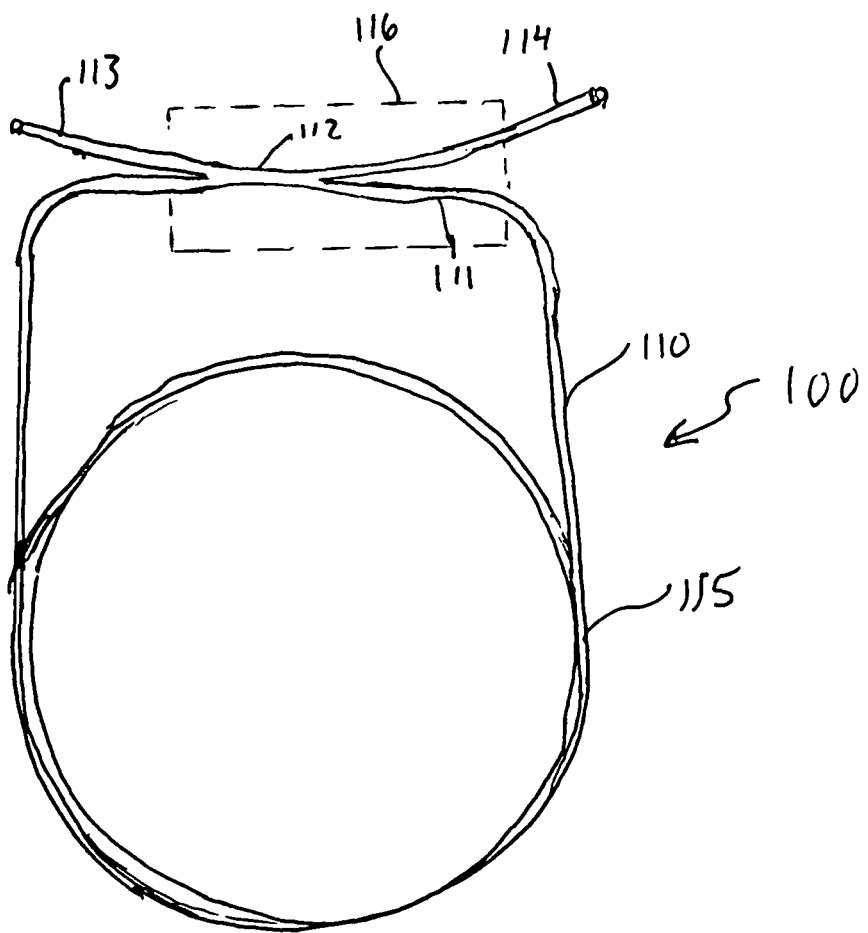
FIG. 3A illustrates another embodiment of the invention showing alternative construction details.

FIG. 1 illustrates a prior art single-mode polarization-maintaining or single-polarization fiber optic ring 1. In such systems, a fiber coil 2 is coupled to inlet and outlet fibers 3,4 by a coupler 5 such as lapped coupler formed of two coupler blocks 5a, 5b. Alternatively, coupler 5 may in some embodiments be a fused coupler, in which case the fiber holding structure is simply a protective metal sheath or a molded plastic block surrounding a junction of the input and coil fibers which have been fused together and drawn to form the coupler.

The present invention, shown in FIG. 2, is a spliced or spliceless resonant ring 10 made of polarization maintaining fiber 11 in which a coil 12 and a tapered polarizer 15 are formed in series along the length of a single fiber to form a ring which is coupled via a fused coupler 16 to inlet and outlet ports or fiber 13, 14. As described more fully below, resonant ring 10 is preferably formed of a single fiber such that the ring, polarizer, and inlet and outlet pigtails constitute portions thereof, the parameters of which are controlled during fabrication to form an effective single mode resonant fiber optic gyro. Typically, the coupler is fabricated to have a loss under approximately (−0.2) dB (transmission T=95%) and the polarizer is fabricated to have a loss under approximately (−0.5) dB (transmission T=89%) and a polarization extinction ratio of 3-10 dB (transmission T=50 to 10%) for the unwanted mode. Preferably, the overall construction further avoids end-to-end splices and other sources of backscatter.

FIG. 3 illustrates the tapered polarizer 15, of FIG. 2. Polarizer 15 is fabricated by heating a PM fiber 11 to the softening point and drawing the fiber sufficiently to form a tapered region 11a to reduce its cross section to an amount which causes one of the polarization modes in the fiber to be radiated out of the fiber. Packaging 16 of conventional type is then fabricated to protect the exposed fiber of the taper region. The polarizer formed directly in the fiber, rather than spliced in or fabricated on a lapped surface, results in negligible backscatter and enhanced polarization parameter drift. During fabrication, the polarizer parameters are monitored to achieve a desired extinction ratio.

The extinction ratio of the polarizer need not be great; it must only be sufficient to prevent resonant build-up of one mode in the ring. With such a polarizer, a single PM fiber may be used for the coil, and a fused coupler 16 may be formed between end regions of the fiber to constitute a resonant ring.

The contrast of this construction with a lapped-coupler SP fiber resonator is instructive. Such prior art RFOGS have champion performance of finesse approximately equal to 20, with zero dip depth. Dip depth approaches 100% contrast when coupler splitting ratio $\kappa^2$ is optimized to equal loop losses $\rho^2$, which includes coupler and SP fiber losses. For zero depth, splitting ratio and loop loss can be approximated by $$\kappa^2 = \rho^2 \approx e^{-\pi/F}$$

fractional where F=finesse.

This yields a value of about −0.7 dB total loop loss. Assuming fused MSR PM coupler loss less than 0.1 dB and neglecting PM fiber loss (typically 0.5 dB/km), a tapered polarizer having less than 0.6 dB loss will have performance equal to present lapped SP RFOG technology performance, but with vastly enhanced environmental performance. The fabrication of tapered polarizers in this loss range is known and has been reported. It should be further noted that MSR PM fiber has not generally been used in tapered polarizer investigations. Presumably, the same loss mechanisms exist for PM fused coupler technology, and MSR tapered polarizers promise to meet the loss performance level under 0.2 dB. For the same assumptions as above, this would indicate a finesse of about 65, which is a great improvement over the prior art, while also providing enhanced environmental ruggedness.

FIG. 4 shows a fixture and system 20 for fabricating a suitable tapered polarizer. Light from a pigtailed diode laser 21 is polarized and launched into a long length of PM MSR fiber 31 at a 45 degree angle to the fiber birefringent principal axes. If a spliceless device is desired, the fiber length is sufficient to form a resonator and in that case the major portion of the fiber 22 is already preferably wound on a coil form as shown. Launching the light at 45 degrees excites equal power in both modes. A heat source 24 applies heat to a region 31a of the fiber so it may be drawn, and light which has passed through the fiber is split by a polarization beam-splitter 25 to separately direct the s and p polarizations at photodiodes 26a, 26b. The outputs of the photodiodes pass to a signal processor 27 which develops an output representative of the polarization extinction ratio (PER) and the loss. The device then applies a controlled drawing force via a drawing mechanism 28, while using the PER signal as a closed loop control signal to produce a polarizer having the desired characteristics.

Essentially, the fixture 20 is a conventional fused coupler fabrication machine, which functions in the same manner as when making a PM fiber fused coupler, except that a voltage proportional to PER rather than to coupling ratio is used to servo the system. The completed polarizer is then enclosed using known fused coupler packaging techniques.

In setting up and monitoring the fixture 20, care is taken to minimize coherent effects. A broadband source and launching through the fiber coil will maximize depolarization, which would otherwise destabilize readings. A simple analog divider and logarithmic amplifier circuit are used to create loss and PER values required for closed-loop processing.

Once the loss of the tapered polarizer is known, the resonator coupler is fabricated, using a fixture such as illustrated in FIG. 5.

To make the coupler, the fiber is again placed in a fused coupler fabrication machine with regions of the pigtails each prepared and placed to form a coupling therebetween. A tunable narrow linewidth laser provides a linearly polarized signal to one pigtail which is aligned with the axis of the non-attenuated fiber polarization, and the laser is swept through the ring resonances while the light exiting the other pigtail is monitored on a fast photodetector 31. Amplifier 32 and signal processor 33 develop output signals indicative of the resonant ring dip depth and finesse, which are used as feedback signals to control the drawing of the tapered coupling. The drawing is stopped, when taking into account the expected shift upon cooling, the coupler splitting ratio equals the previously determined loop loss $\kappa^2 = \rho^2$.

The completed coupler is then packaged. One suitable packaging technique is disclosed in applicant's earlier U.S. patent application Ser. No. 460,637 filed Jan. 3, 1990 and entitled Fused Fiber Optic Coupler. The text of that patent application is hereby incorporated by reference in this disclosure.

FIG. 3A illustrates another construction of a single mode RFOG in accordance with the invention. The fibers are illustrated with a visible diameter to more clearly show the location of regions of taper for the polarizer and coupler in this embodiment. RFOG system 100 includes a single fiber 110 which is wound in a coil 115. One end of the fiber 110 exiting the coil is drawn and tapered at region 111 to form a polarizer, while both ends are also joined in a tapered fusion splice at region 112 to close the ring such that the ends 113, 114 become input and output pigtails to the ring. A common sleeve or molded block 116, shown in phantom, protects both the polarizer region and the coupling junction.

The foregoing fabrication steps provide a construction of an RFOG with all fused components, that eliminates the orthogonal resonance and simplifies the fabrication process while providing an overall structure with reduced tendency to drift and with an overall environmental ruggedness. By using matched stress region MSR PM fiber, the costs are greatly reduced from those of SP fibers, while the corresponding fused coupler achieves a level of performance compatible with aircraft-grade guidance systems.

This invention is considered to have applications in the field of fiber optics sensors, particularly for resonant fiber optic gyroscopes. Other related instruments, such as Sagnac and resonant gyroscopes, hydrophones, magnetometers, and coherent communications instruments all require rugged, stable optical couplers. At the present, the lapped polarization-maintaining couplers generally employed for these devices have poor environmental resistance. Fused couplers have demonstrated environmental stability and reliability but cannot use single-polarization fiber at present. The present invention permits use of a PM fiber for fabrication of devices in which separate polarization must be achieved, and is well suited for mass production while eliminating PCC effects such as the orthogonal dip which produces drift in an RFOG. This technology is particularly suited to the mass production of small, lightweight inertial measurement systems that cannot use ring laser or mechanical gyroscope assemblies.

The invention being thus disclosed, variations and modifications will occur to those skilled in the art, and all such variations and modifications are considered to lie within the scope of the invention, as defined by the claims appended hereto.

What is claimed is:

1. A polarization maintaining optical fiber comprising in series
   a first end segment,
   a ring portion consisting of at least one turn of the fiber through which light travelling in the fiber executes multiple passes,
   said ring portion being a resonant ring, and further containing a fused tapered polarizer formed id ring portion having a taper effective to selectively attenuate one linearly polarized mode of said light sufficiently to prevent resonance thereof in the ring portion.

2. A polarization maintaining optical fiber according to claim 1, wherein a portion of said first end segment is joined to a portion of said second end segment in a polarization maintaining coupling so that the loop portion and fused tapered portion lying between said end segments constitutes a closed ring that resonates in a single polarization mode.

3. A polarization maintaining optical fiber according to claim 2, wherein said polarization maintaining coupling is a fused coupler.

4. A sensing structure for a resonant fiber optic gyro comprising a closed fiber optic resonant ring formed by a polarization maintaining optical fiber having end regions thereof joined in a fused polarization maintaining coupler so that light coupled from an end region into the ring maintains its state of polarization and travels plural times about the ring, and
   a fused tapered portion formed in said ring and having an amount of taper effective to attenuate one polarization of light traveling about the ring sufficiently to prevent its resonance in the ring.

5. A sensing structure for a resonant fiber optic gyro according to claim 4, wherein the coupler has a splitting ratio substantially equal to loss of light traveling in said ring and fused tapered portion.

6. A sensing structure for a resonant fiber optic gyro according to claim 4, wherein the fused tapered portion attenuates said one polarization by between ten and fifty percent.

7. A sensing structure for a resonant fiber optic gyro according to claim 6, wherein said coupler has an insertion loss of under approximately 0.2 decibels.

8. A sensing structure according to claim 7, fabricated as single fiber without end-to-end splices.

9. A fiber optic sensor comprising a single polarization maintaining fiber having a first sensing portion defining a resonating cavity in which a light signal of a first polarization is propagated and also having a second tapered portion included in said first portion, said second tapered portion having an amount of taper effective to attenuate light of a second polarization which would otherwise interfere with the light signal.

10. A fiber optic sensor according to claim 9, wherein said taper attenuates an amount of light of said second polarization that is effective to prevent resonance of the light of said second polarization in said fiber.

11. A method of fabricating a fiber optic ring which resonates in a single polarization, such method comprising the steps of
   i) forming a tapered polarizer in a polarization maintaining fiber to effectively attenuate one polarization state of light traveling in the fiber, and
   ii) joining regions of opposed ends of the polarization maintaining fiber in a polarization maintaining coupler such that a length of fiber between joined regions includes the polarizer thereby forming a closed resonant ring having an optical path length such that for light of a wavelength divisible into said optical path length the closed ring constitutes a resonant cavity that resonates in a single polarization mode.

12. A sensing structure for a resonant fiber optic gyro, such sensing structure comprising
   a strand of optical fiber having a first end and a second end formed of birefringent material,
   a central portion of the strand formed into a resonant ring by fusion of a region of the fiber near said first end with a region of the fiber near said second end to constitute a low insertion loss coupler of defined coupling ratio between said ends and the central portion, first and second polarizations being separately guided in said resonant ring, and
   a polarizer included in said central portion for selectively attenuating light of one of said first and second polarizations, while substantially passing light of the other of said first and second polarizations, so that only light of the other of said first and second polarizations may achieve resonance in the resonant ring.

* * * * *